United States Patent
Sprock et al.

(10) Patent No.: US 9,685,009 B2
(45) Date of Patent: Jun. 20, 2017

(54) SYSTEM AND METHOD FOR MANAGING MIXED FLEET WORKSITES USING VIDEO AND AUDIO ANALYTICS

(71) Applicant: Caterpillar Inc., Peoria, IL (US)

(72) Inventors: Christopher Sprock, East Peoria, IL (US); Ryan Baumann, Peoria, IL (US); Sanat Talmaki, Peoria, IL (US); Praveen Halepatali, Savoy, IL (US)

(73) Assignee: Caterpillar Inc., Peoria, IL (US)

( * ) Notice: Subject to any disclaimer, the term of this patent is extended or adjusted under 35 U.S.C. 154(b) by 72 days.

(21) Appl. No.: 14/676,243

(22) Filed: Apr. 1, 2015

(65) Prior Publication Data

US 2016/0292933 A1    Oct. 6, 2016

(51) Int. Cl.
*G07C 5/00* (2006.01)
*G06Q 10/06* (2012.01)
*G07C 5/08* (2006.01)

(52) U.S. Cl.
CPC ......... *G07C 5/008* (2013.01); *G06Q 10/0639* (2013.01); *G07C 5/0866* (2013.01)

(58) Field of Classification Search
USPC ......... 701/29.3, 31, 31.9, 33.7, 50; 348/143, 348/61; 382/103; 340/438
See application file for complete search history.

(56) References Cited

U.S. PATENT DOCUMENTS

| | | |
|---|---|---|
| 5,983,161 A | 11/1999 | Lemelson et al. |
| 8,779,944 B2 | 7/2014 | Weinmann et al. |
| 8,847,788 B2 * | 9/2014 | Borland ............... G08G 1/0112 340/906 |

(Continued)

FOREIGN PATENT DOCUMENTS

| | | | | |
|---|---|---|---|---|
| WO | WO 2005060404 A2 * | 7/2005 | ............. | G06Q 10/08 |
| ZA | GB 2473956 B * | 12/2011 | ............. | B60R 25/04 |

OTHER PUBLICATIONS

Smart adaptable network device for fleet management and driver coaching; M. Delehaye; D. Hubaux; L. Guedria; J. -D. Legat; T. Delvaulx; B. Goffard; 2007 7th International Conference on ITS Telecommunications; Year: 2007; pp. 1-5, DOI: 10.1109/ITST.2007.4295870.*

(Continued)

*Primary Examiner* — Cuong H Nguyen
(74) *Attorney, Agent, or Firm* — Baker Hostetler

(57) ABSTRACT

Systems and methods for managing and optimizing mixed fleet worksite operations based on video and or audio data are disclosed. One method includes receiving one or more models relating to a fleet of machines at the worksite, wherein the fleet of machines comprises an in-network machine and an out-of-network machine, receiving first sensor data associated with the out-of-network machine at the worksite, receiving second sensor data associated with the in-network machine at the worksite, determining a machine state of each of the in-network machine and the out-of-network machine based at least on the first sensor data and the second sensor data, comparing the determined machine states to a modeled machine state represented by the received one or more models to classify site operations and/or detect an irregularity in site operations or an inefficiency in site operations, and generating a response based at least on the detected irregularity or inefficiency.

17 Claims, 7 Drawing Sheets

(56) References Cited

U.S. PATENT DOCUMENTS

| | | | | |
|---|---|---|---|---|
| 2001/0018628 | A1* | 8/2001 | Jenkins | G08G 1/127 701/33.4 |
| 2003/0114965 | A1* | 6/2003 | Fiechter | G06F 11/2263 701/29.3 |
| 2009/0051510 | A1* | 2/2009 | Follmer | G07C 5/008 340/425.5 |
| 2011/0130893 | A1* | 6/2011 | Gilleland | G06Q 10/063114 701/2 |
| 2011/0299730 | A1 | 12/2011 | Elinas et al. | |
| 2013/0085638 | A1* | 4/2013 | Weinmann | B64D 45/00 701/36 |
| 2013/0101174 | A1 | 4/2013 | Meis et al. | |
| 2014/0058616 | A1* | 2/2014 | de Oliveira | G06Q 10/06 701/29.3 |
| 2014/0132422 | A1* | 5/2014 | Borland | G08G 1/0112 340/907 |
| 2014/0205139 | A1 | 7/2014 | Kriel et al. | |
| 2014/0247347 | A1* | 9/2014 | McNeill | H04N 7/18 348/143 |
| 2014/0307922 | A1 | 10/2014 | Kim et al. | |

OTHER PUBLICATIONS

A dynamic routing strategy for the real-time management of a fleet of tank trucks; D. Giglio; M. Paolucci; R. Sacile Systems, Man and Cybernetics, 2004 IEEE International Conference on; Year: 2004, vol. 7; pp. 6250-6255 vol. 7, DOI: 10.1109/ICSMC.2004.1401380.*

Platform degrader analysis for the complex systems for the design and application of condition based maintenance; Jeffrey C. Banks; Mitchell Lebold; Karl M. Reichard; Jason A. Hines; Mark S. Brought; 2014 IEEE Aerospace Conference Year: 2014; pp. 1-12, DOI: 10.1109/AERO.2014.6836443.*

Platform degrader analysis for the design and development of Vehicle Health Management Systems; Jeffrey C. Banks; Karl M. Reichard; Jason A. Hines; Mark S. Brought; Prognostics and Health Management, 2008. PHM 2008. International Conference on Year: 2008; pp. 1-12, DOI: 10.1109/PHM.2008.4711468.*

Model predictive trajectory tracking control for hydraulic excavator on digging operation; Takumi Tomatsu; Kenichiro Nonaka; Kazuma Sekiguchi; Katsumasa Suzuki; 2015 IEEE Conference on Control Applications (CCA); Year: 2015; pp. 1136-1141, DOI: 10.1109/CCA.2015.7320765.*

On application of an imperfect repair model in maintenance scheduling; Tuan Nguyen; Yann Dijoux; Mitra Fouladirad; 2015 Annual Reliability and Maintainability Symposium (RAMS); Year: 2015; pp. 1-5, DOI: 10.1109/RAMS.2015.7105096.*

Equipment to estimate the quantity of excavated material with energetic methods, in open pits; G. Vladut; A. Mogosan; V. Kese; D. I. Bucur; 2006 IEEE International Conference on Automation, Quality and Testing, Robotics; Year: 2006, vol. 1 pp. 181-184, DOI: 10.1109/AQTR.2006.254521.*

Increased productivity with AC drives for mining excavators and haul trucks; G. M. Brown et al.; Conf. Record of the 2000 IEEE Industry Applications Conf. Thirty-Fifth IAS Annual Meeting and World Conf. on Industrial Applications of Electrical Energy (Cat. No. 00CH37129); Year: 2000, vol. 1; pp. P28-P37 vol. 1, DOI: 10.1109/IAS.2000.880962.*

\* cited by examiner

SYSTEM AND METHOD FOR MANAGING MIXED FLEET WORKSITES USING VIDEO AND AUDIO ANALYTICS

TECHNICAL FIELD

This disclosure relates generally to worksite operations involving heavy machinery, and more particularly to a system and method for managing a mixed fleet worksite using video and/or audio analytics.

BACKGROUND

A worksite, such as a mining or construction site, will typically include a variety of machines, such as bulldozers, excavators, dump trucks, and the like, working cooperatively to accomplish a particular task. In order to accomplish the task efficiently, the operation, availability, and mechanical status of the machines may be tracked and coordinated to ensure that each machine is used to its maximum benefit. For example, if a worksite included an excavator filling dump trucks with material, a shortfall of dump trucks would result in the excavator sitting idly while waiting for an empty dump truck to receive the excavated material. An important factor in coordinating the machines for optimal efficiency is the machine state of various machines operating at the worksite. However, certain worksites may be a fixed fleet worksite including various models of machines from the same or different manufactures. As such, some machines may not have the ability to communicate state information with other machines at the same worksite.

One method for analyzing a change in machine operations is disclosed in U.S. Pat. Appl. Pub. No. 2014/0247347 to McNeill et al. (the '347 application). The '347 application describes a camera or video system for monitoring, analyzing and controlling the operation of a machine (e.g., a corrugated-paper-processing machine). In some examples, the camera system includes one or more video cameras and video analytics for identifying one or more states and/or changes in state for a process or flow, such as distinguishing between a first state of the machine, such as a steady-state flow and a second state or states of the machine, such as a jam state or states, and/or a state or states of impending jam of the machine or articles operated on by the machine.

Although the '347 application describes a method that may help detect a change in simple machine states (e.g., steady-state and jam state of conveyer, safe zone and pedestrian zone for forktrucks), the method may be unsuitable for applications involving large machines in an open, expansive worksite such as a construction site or mine site, having multiple machine states and external variables complicating the analysis of images. Furthermore, the '347 application does not address the complications of having a mixed fleet worksite. These and other shortcomings of the prior art are addressed by this disclosure.

SUMMARY

This disclosure relates to systems and methods for managing and optimizing mixed fleet worksite operations based on video and or audio data are disclosed. One method includes receiving, by one or more processors, one or more models relating to a worksite or a fleet of machines at the worksite, wherein the fleet of machines comprises an in-network machine and an out-of-network machine, receiving, by the one or more processors, first sensor data associated with the out-of-network machine at the worksite, the first sensor data comprising one or more of image data and audio data, receiving, by the one or more processors, second sensor data associated with the in-network machine at the worksite, determining, by the one or more processors, a machine state of each of the in-network machine and the out-of-network machine based at least on the first sensor data and the second sensor data, comparing the determined machine states to a modeled machine state represented by the received one or more models to detect an irregularity in site operations or an inefficiency in site operations, and generating a response based at least on the detected irregularity or inefficiency.

In an aspect, a system may include a processor and a memory bearing instructions that, upon execution by the processor, cause the processor to: receive one or more models relating to a worksite or a fleet of machines at the worksite, wherein the fleet of machines comprises an in-network machine and an out-of-network machine; receive first sensor data associated with the out-of-network machine at the worksite, the first sensor data comprising one or more of image data and audio data; receive second sensor data associated with the in-network machine at the worksite; determine a machine state of each of the in-network machine and the out-of-network machine based at least on the first sensor data and the second sensor data; and compare the determined machine states to a modeled machine state represented by the received one or more models to classify one or more site operations.

In an aspect, a computer readable storage medium may bear instructions that, upon execution by one or more processors, effectuate operations comprising receiving, by the one or more processors, one or more models relating to a worksite or a fleet of machines at the worksite, wherein the fleet of machines comprises an in-network machine and an out-of-network machine, receiving, by the one or more processors, first sensor data associated with the out-of-network machine at the worksite, the first sensor data comprising one or more of image data and audio data, receiving, by the one or more processors, second sensor data associated with the in-network machine at the worksite, determining, by the one or more processors, a machine state of each of the in-network machine and the out-of-network machine based at least on the first sensor data and the second sensor data, comparing the determined machine states to a modeled machine state represented by the received one or more models to detect an irregularity in site operations or an inefficiency in site operations, and generating a response based at least on the detected irregularity or inefficiency.

BRIEF DESCRIPTION OF THE DRAWINGS

The following detailed description is better understood when read in conjunction with the appended drawings. For the purposes of illustration, examples are shown in the drawings; however, the subject matter is not limited to the specific elements and instrumentalities disclosed. In the drawings.

DETAILED DESCRIPTION

System, methods, and computer readable medium for determining machine states at a mixed fleet worksite (e.g., construction site, minesite, etc.) using at least video and/or audio analytics are disclosed. In an aspect, visual/audio data may be collected including: satellite-captured data, drone-captured data, site level video/audio, regional video/audio, machine level video/audio, payload video/audio, machine-to-machine video/audio, operator video/audio, and the like. Various filters such as thermal, infrared, and night vision may be applied to the collected data. The collected data may be processed (e.g., via a machine learning algorithm) to determine signatures/fingerprints of various machine states. The collected data may be compared/overlaid with telematics data. Once the signatures are recognized, they may be used to identify matching signatures from subsequently captured data regardless of the manufacturer of the machine. As an example, machine states may include, full load, empty load, payload material type, payload vs. air ratio (e.g., payload density), payload placement, payload compaction, payload water content, material amount moved, drop placement, excavator position, idle state, swing, dump position, deformation of machine, operator characteristic, ground crew location relative to machine, and the like.

A database of machine states may be populated via processing of captured data. Once a machine state is identified (e.g., independent of fleet manufacturer), information relating to the machine states may be generated. For example, reports may be generated relating to production versus target, safety protocols, best practices, exposure of blasting process (e.g., target material density), maintenance schedules, efficiencies in machine operation, and maximizing utilization time, for example. Furthermore, manufacturer-independent machine state identification may be used to manage mixed-fleet mine sites.

Figure 1:
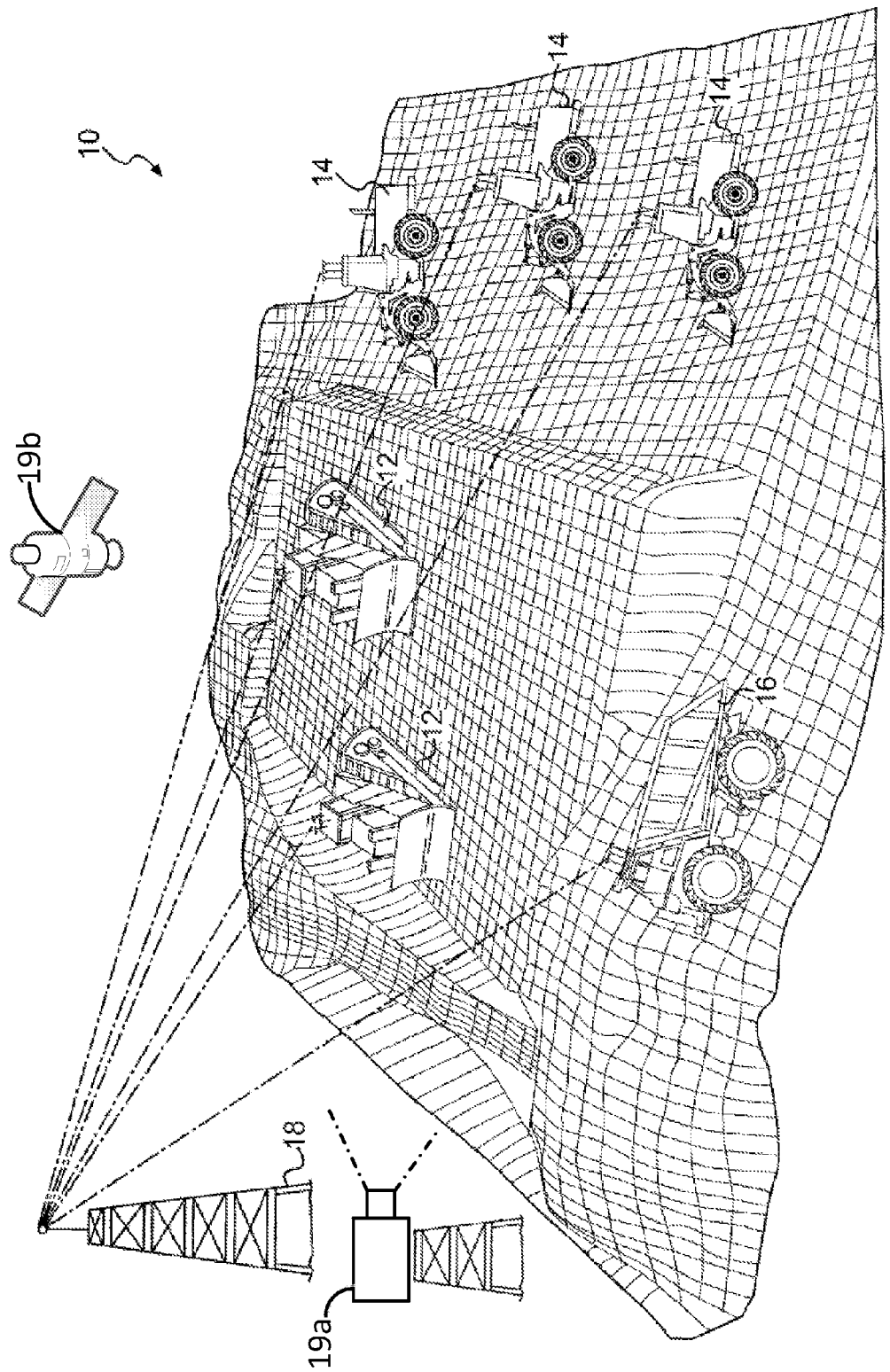
FIG. 1 illustrates an exemplary worksite in accordance with aspects of the disclosure.

FIG. 1 shows a worksite 10 such as, for example, an open pit mining operation or a construction site. As part of the mining function, various machines may operate at or between different locations of the worksite 10. These machines may include, one or more digging machines 12, one or more loading machines 14, one or more hauling machines 16, one or more transport machines (not shown), and/or other types of machines known in the art.

In certain aspects, one or more of the machines 12, 14, 16 may be an in-network machine and may be in communication with each other and with a central station 18 by way of wireless communication (such as a communication channel as defined herein) to remotely transmit and receive operational data and instructions. In other aspects, one or more of the machines 12, 14, 16 may be an out-of-network machine and may not be configured to communicate with each other or with a central station 18. As an example, the out-of network machine may be a model of machine that is not equipped with the communication technology necessary to effect communication with other machines or the central station 18. As another example, the out-of-network machine may be a machine that is provided by a manufacturer different from the rest of the machines included in the fleet operating at the worksite 10.

Information relating to the machines 12, 14, 16 may be captured via an onsite sensor 19a such as a video camera, infrared sensor, thermal sensor, audio recorder, RADAR sensor, LIDAR sensor, optical sensor, or the like. Information relating to the machines 12, 14, 16 may be captured via an offsite sensor 19b, which may be similar to the offsite sensor and disposed on a satellite, drone, aircraft, or other offsite device. The information captured via the sensors 19a, 19b may be transmitted to a processor such as the central station 18 by way of wireless communication (such as the communication channels defined herein).

The digging machine 12 may refer to any machine that reduces material at the worksite 10 for the purpose of subsequent operations (e.g., for blasting, loading, and hauling operations). Examples of the digging machines 12 may include excavators, backhoes, dozers, drilling machines, trenchers, drag lines, etc. Multiple digging machines 12 may be co-located within a common area at worksite 10 and may perform similar functions. As such, under normal conditions, similar co-located digging machines 12 should perform about the same with respect to productivity and efficiency when exposed to similar site conditions.

The loading machine 14 may refer to any machine that lifts, carries, and/or loads material that has been reduced by the digging machine 12 onto waiting hauling machines 16. Examples of the loading machine 14 may include a wheeled or tracked loader, a front shovel, an excavator, a cable shovel, a stack reclaimer, or any other similar machine. One or more loading machines 14 may operate within common areas of the worksite 10 to load reduced materials onto the hauling machines 16. Under normal conditions, similar co-located loading machines 14 should perform about the same with respect to productivity and efficiency when exposed to similar site conditions.

The hauling machine 16 may refer to any machine that carries the excavated materials between different locations within the worksite 10. Examples of the hauling machine 16 may include an articulated truck, an off-highway truck, an on-highway dump truck, a wheel tractor scraper, or any other similar machine. Laden hauling machines 16 may carry overburden from areas of excavation within the worksite 10, along haul roads to various dump sites, and return to the same or different excavation areas to be loaded again. Under normal conditions, similar co-located hauling machines 16 should perform about the same with respect to productivity and efficiency when exposed to similar site conditions. Other machines may be at the worksite and may implement aspects of this disclosure, including compactors, graders, pavers, etc.

Figure 2:
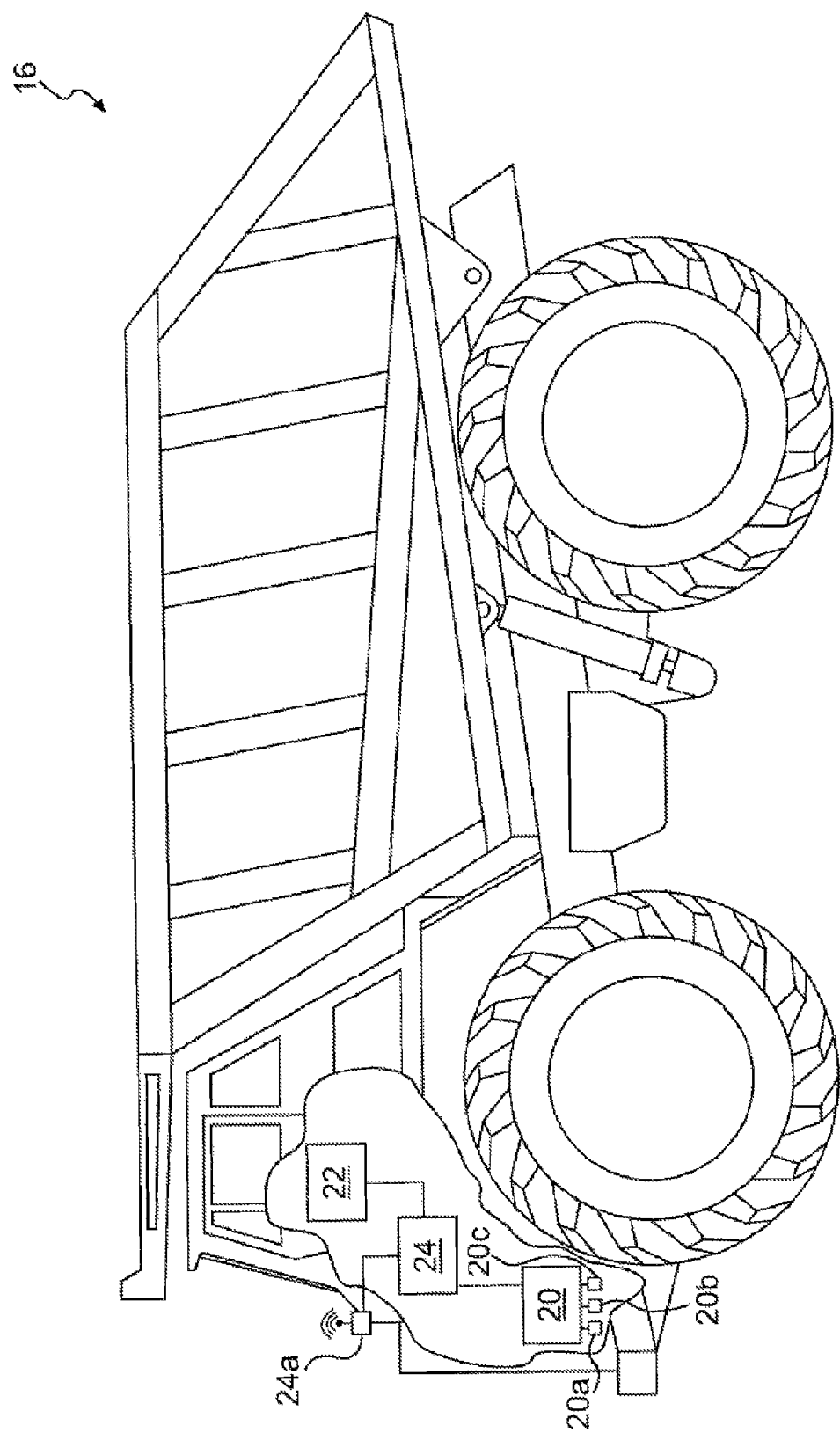
FIG. 2 illustrates a schematic side view of an exemplary machine in accordance with aspects of the disclosure.

FIG. 2 shows one exemplary machine that may be operated at the worksite 10. It should be noted that, although the depicted machine may embody the hauling machine 16, the following description may be equally applied to any machine operating at the worksite 10. In certain aspects, one or more of the machines 12, 14, 16 may be an in-network machine and may be in communication with each other and with a central station 18 by way of wireless communication (such as a communication channel as defined herein) to remotely transmit and receive operational data and instructions. In certain aspects, one or more of the machines 12, 14, 16 may be an out-of-network machine and may not be configured to communicate with each other or with a central station 18. In other aspects, an out-of-network machine may be equipped to communicate with certain machines 12, 14, 16 and not others in a mixed fleet environment. For example, various communication networks may be configured for different manufacturers or providers and may not be compatible to cross-talk with other communication networks. Accordingly, even the machines 12, 14, 16 that are equipped with wireless communication technology may be out-of-network machines in a particular worksite.

As an example, the hauling machine 16 may record and transmit data to the central station 18 (referring to FIG. 1) during its operation on a communication channel as defined herein. Similarly, the central station 18 may analyze the data and transmit information to the hauling machine 16 on a communication channel as defined herein. The data transmitted to the central station 18 may include payload data, operator data, machine identification data, performance data, worksite data, diagnostic data, and other data, which may be automatically monitored from onboard the hauling machine 16 and/or manually observed and input by machine operators. The information remotely transmitted back to the hauling machines 16 may include electronic terrain maps, machine configuration commands, instructions, recommendations and/or the like.

Payload data may include information relating to the material being hauled, processed, or displaced and may include binary state information of a material load such as full load or empty load, as well as, dynamic information such as payload material type (e.g., aggregate, ore, etc.), payload vs. air ratio (e.g., payload density), payload placement, amount of material moved, compaction, water content, drop placement, and the like. Payload data may relate to material being moved, compacted, shoveled, hauled, or other type of processing at a worksite. The term material load may refer to any material being processed at the worksite and is not so limited to a hauling process, for example.

Identification data may include machine-specific data, operator-specific data, location-specific data and/or the like. Machine-specific data may include identification data associated with a type of machine (e.g., digging, loading, hauling, etc.), a make and model of machine (e.g., Caterpillar 797 OHT), a machine manufacture date or age, a usage or maintenance/repair history, etc. Operator-specific data may include an identification of a current operator, information about the current operator (e.g., a skill or experience level, an authorization level, an amount of time logged during a current shift, a usage history, etc.), a history of past operators, and the like. Site-specific data may include a task currently being performed by the operator, a current location at the worksite 10, a location history, a material composition at a particular area of the worksite 10, a site-imposed speed limit, etc.

Performance data may include current and historic data associated with operation of any machine at the worksite 10. Performance data may include, for example, payload information, efficiency information, productivity information, fuel economy information, speed information, traffic information, weather information, road and/or surface condition information, maneuvering information (e.g., braking, steering, wheel slip, etc.), downtime and repair or maintenance information, etc.

Diagnostic data may include recorded parameter information associated with specific components and/or systems of the machine. For example, diagnostic data may include engine temperatures, engine pressures, engine and/or ground speeds and acceleration, fluid characteristics (e.g., levels, contamination, viscosity, temperature, pressure, etc.), fuel consumption, engine emissions, braking conditions, transmission characteristics (e.g., shifting, torques, and speed), air and/or exhaust pressures and temperatures, engine calibrations (e.g., injection and/or ignition timings), wheel torque, rolling resistance, system voltage, etc. Some diagnostic data may be monitored directly, while other data may be derived or calculated from the monitored parameters. Diagnostic data may be used to determine performance data, if desired.

To facilitate the collection, recording, and transmitting of data from the machines at the worksite 10 to the central station 18 (referring to FIG. 1) and vice versa, each of the hauling machines 16 may include an onboard control module 20, an operator interface module 22, and a communication module 24. The communication module 24 may communicate over a communication channel as defined herein. Data received by the control module 20 and/or the operator interface module 22 may be sent offboard to the central station 18 by way of the communication module 24. The communication module 24 may also be used to send instructions and/or recommendations from the central station 18 to an operator of the hauling machine 16 by way of the operator interface module 22. It is contemplated that additional or different modules may be included onboard the hauling machine 16, if desired.

The control module 20 may include a plurality of sensors 20a, 20b, 20c distributed throughout the hauling machine 16 and/or the operator and configured to gather data from the operator and/or various components and subsystems of the hauling machine 16. It is contemplated that a greater or lesser number of sensors may be included than that shown in FIG. 2.

In an aspect, the sensors 20a-c may include any device that senses, detects, or measures a condition or state of the hauling machine 16. The sensors 20a-c may be directed toward sensing a machine state relating to the operation of the hauling machine 16 relative to a mine model or simulated plan. As an example, machine states may include, full load, empty load, payload material type, payload vs. air ratio (e.g., payload density), payload placement, drop placement, excavator position, idle state, swing, dump position, deformation of machine, and the like. The sensors 20a-c may include RADAR, LIDAR, infrared, thermal, audio, and/or an image capture device such as a video camera. Machine states may relate to any information pertaining to the operation of a machine. Examples of data gathered from the sensors 20a-c include operator manipulation of the input devices, tool, or power source, machine velocity, machine location, fluid pressure, fluid flow rate, fluid temperature, fluid contamination level, fluid viscosity, electric current level, electric voltage level, fluid (e.g., fuel, water, oil) consumption rates, payload level, payload value, percent of maximum allowable payload limit, payload history, payload distribution, transmission output ratio, cycle time, idle time, grade, recently performed maintenance, or recently performed repair.

In another aspect, the sensors 20a-c may be associated with a power source (not shown), a transmission (not shown), a traction device, a work implement, an operator station, and/or other components and subsystems of the hauling machine 16. These sensors may be configured to provide data gathered from each of the associated components and subsystems. Other pieces of information may be generated or maintained by data control module 20 such as, for example, time of day, date, weather, road or surface conditions, and machine location (global and/or local).

The control module 20 may also be in direct communication with the separate components and subsystems of the hauling machine 16 to facilitate manual, autonomous, and/or remote monitoring and/or control of the hauling machine 16. For example, control module 20 may be in communication with the power source of the hauling machine 16 to control fueling, the transmission to control shifting, a steering mechanism to control heading, a differential lock to control traction, a braking mechanism to control deceleration, a tool actuator to control material dumping, and with other components and/or subsystems of the hauling machine 16. Based on direct commands from a human operator, remote commands from the central station 18 or another one of the machines 12, 14, 16 at the worksite 10, and/or self-direction, the control module 20 may selectively adjust operation of the components and subsystems of the hauling machine 16 to accomplish a predetermined task.

The operator interface module 22 may be located onboard the hauling machine 16 for collection and/or recording of data. The operator interface module 22 may include or be communicatively connected to one or more operator data input devices such as a press-able button, a movable dial, a keyboard, a touchscreen, a touchpad, a pointing device, or any other means by which an operator may indicate an aspect of his or her condition. For example, the operator interface module 22 may include a touchpad, which may be used by the operator to move a cursor on a display screen, such as an LCD screen, to select an indicator of the operator's condition. The data received via the operator interface module 22 may include observed information associated with the worksite 10, the hauling machine 16, and/or the operator.

The communication module 24 may include any device that facilitates communication of data between the hauling machine 16 and the central station 18, and/or between the machines 12, 14, 16. The communication module 24 may include hardware and/or software that enables sending and/or receiving data through a wireless communication link 24a. It is contemplated that, in some situations, the data may be transferred to the central station 18 and/or other machines 12, 14, 16 through a direct data link (not shown), or downloaded from the hauling machine 16 and uploaded to the central station 18, if desired. It is also contemplated that, in some situations, the data automatically monitored by the control module 20 may be electronically transmitted, while the operator-observed data may be communicated to the central station 18 by a voice communication device, such as a two-way radio (not shown).

The communication module 24 may also have the ability to record the monitored and/or manually input data. For example, the communication module 24 may include a data recorder (not shown) having a recording medium (not shown). In some cases, the recording medium may be portable, and data may be transferred from the hauling machine 16 to the central station 18 or between the machines 12, 14, 16 using the portable recording medium.

Figure 3:
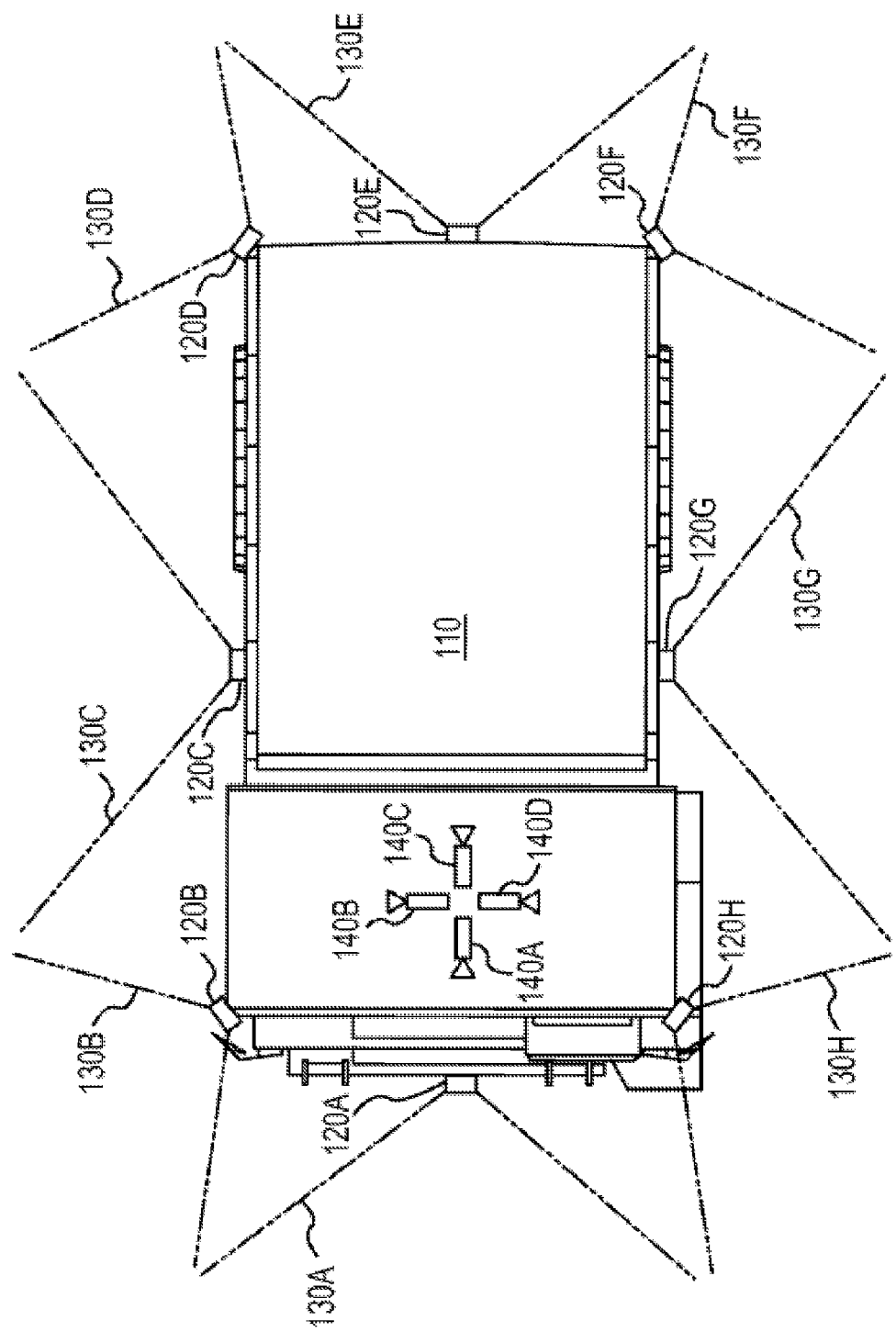
FIG. 3 illustrates a schematic top view of an exemplary machine in accordance with aspects of the disclosure.

FIG. 3 illustrates an exemplary machine 110 having multiple systems and components that cooperate to accomplish a task. The machine 110 may embody a fixed or mobile machine that performs some type of operation associated with an industry such as mining, construction, farming, transportation, or any other industry known in the art. For example, the machine 110 may be similar to machines 12, 14, 16 (FIG. 1) and may embody an earth moving machine such as an excavator, a dozer, a loader, a backhoe, a motor grader, a dump truck, or any other earth moving machine. The machine 110 may include one or more first sensors 120a-120h (e.g., RADAR, LIDAR, infrared, thermal, audio, etc.) and one or more second sensors 140a-140d (e.g., image capture device, video camera, etc.). While the machine 110 is shown having eight first sensors 120a-120h, and four second sensors 140a-140d, those skilled in the art will appreciate that the machine 110 may include any number of sensors arranged in any manner. The sensors 120, 140 may be similar to the sensors 20a-c.

The first sensors 120a-120h and the second sensors 140a-140d may be included on the machine 110 during operation of the machine 110, e.g., as the machine 110 moves about an area to complete certain tasks such as digging, loosening, carrying, drilling, or compacting different materials. In certain aspects, one or more of the first sensors 120a-120h and the second sensors 140a-140d may be disposed onsite (e.g., sensor 19a (FIG. 1)) or offsite (e.g., sensor 19b (FIG. 1)) during operation of the machine 110.

The machine 110 may use the first sensors 120a-120h to detect features of objects in their respective fields of view 130a-130h. For example, one of the first sensors 120a may be configured to scan an area within a field of view 130a to detect features of one or more objects. During operation, one or more systems of the machine 110 may process sensor data received from one of the first sensor devices 120a to detect features that are in the environment of the machine 110. For example, a machine location system may use radar data to determine a position of the machine 110 relative to other machines or objects. Moreover, one or more systems of the machine 110 may generate an alert, such as a sound, when the machine 110 is determined to be outside of a modeled position or path. The second sensors 140a-140d may be attached to the frame of the machine 110 at a high vantage point. For example, the second sensors 140a-140d may be attached to the top of the frame of the roof of the machine 110. The machine 110 may use the second sensors 140a-140d to detect features of objects in their respective fields of view. For example, the second sensors 140a-140d may be configured to record image data such as video or still images. As a further example, the image data may include images of the material (e.g., payload) being displaced by the machine 110. As such, the image data of the material may be processed to determine features of the material.

Figure 4:
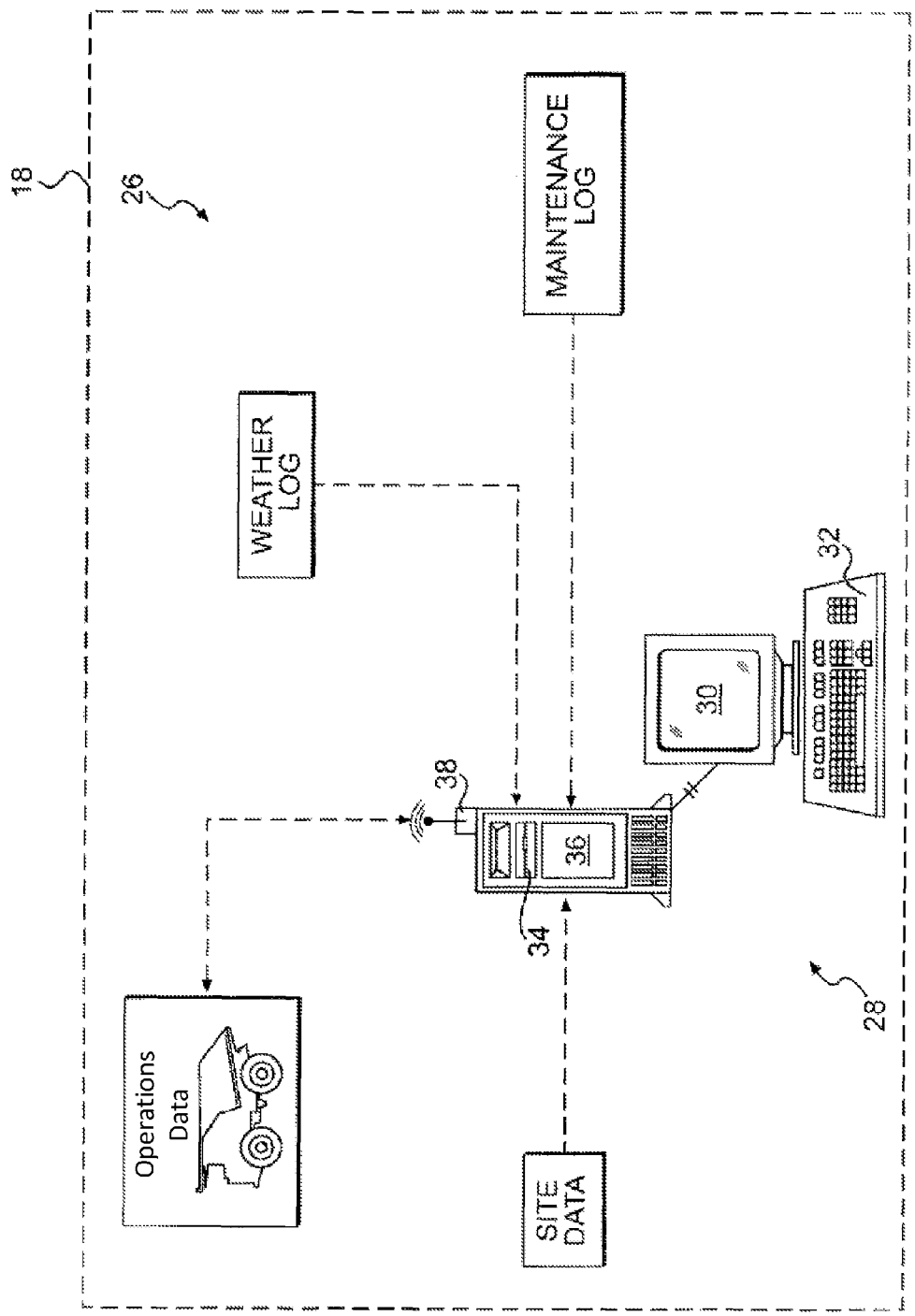
FIG. 4 illustrates a block diagram of an exemplary data flow in accordance with aspects of the disclosure.

FIG. 4 is a schematic illustration of a worksite management system 26 configured to receive and analyze data (e.g., communicated to the central station 18) relating to one or more machines (e.g., machines 12, 14, 16 (FIG. 1) and/or machine 110 (FIG. 3)) or other sources (e.g., operators). The worksite management system 26 may include an offboard controller 28 in remote communication with one or more sensors via the central station 18 and configured to process data from a variety of sources and execute management methods at a worksite. For the purposes of this disclosure, the controller 28 may be primarily focused at positively affecting performance irregularities and/or warning conditions experienced by the operators and/or the machines operating at a worksite such as the worksite 10 (FIG. 10). Positively affecting may include reducing a likelihood of occurrence, reducing a magnitude of the irregularity, reducing a frequency of the irregularity, reducing a severity of the irregularity, minimizing inefficiencies, identifying contributors to error, or otherwise improving machine and/or worksite operation associated with the irregularity.

The controller 28 may include any type of computer or a plurality of computers networked together. The controller 28 may be located proximate the mining operation of the worksite 10 or may be located at a considerable distance remote from the mining operation, such as in a different city or even a different country. It is also contemplated that computers at different locations may be networked together to form the controller 28, if desired. In one aspect, the controller 28 may be located onboard one or more of the machines, if desired.

The controller 28 may include among other things, a console 30, an input device 32, an input/output device 34, a storage media 36, and a communication interface 38. The console 30 may be any appropriate type of computer display device that provides a graphical user interface (GUI) to display results and information to operators and other users of the worksite management system 26. The input device 32 may be provided for operators to input information into the controller 28. The input device 32 may include, for example, a keyboard, a mouse, touch screen, joystick, voice recognition, or another computer input device. The input/output device 34 may be any type of device configured to read/write information from/to a portable recording medium. The input/output device 34 may include among other things, a floppy disk, a CD, a DVD, a flash memory read/write device or the like. The input/output device 34 may be provided to transfer data into and out of the controller 28 using a portable recording medium. The storage media 36 could include any means to store data within the controller 28, such as a hard disk. The storage media 36 may be used to store a database containing among others, historical worksite, machine, and operator related data. The communication interface 38 may provide connections with the central station 18, enabling the controller 28 to be remotely accessed through computer networks, and means for data from remote sources to be transferred into and out of the controller 28. The communication interface 38 may contain network connections, data link connections, and/or antennas configured to receive wireless data.

Data may be transferred to the controller 28 electronically or manually. Electronic transfer of data may include the remote transfer of data using the wireless capabilities or the data link of the communication interface 38 by a communication channel as defined herein. Data may also be electronically transferred into the controller 28 through a portable recording medium using the input/output device 34. Manually transferring data into the controller 28 may include communicating data to a control system operator in some manner, who may then manually input the data into the controller 28 by way of, for example, the input device 32. The data transferred into the controller 28 may include machine identification data, performance data, diagnostic data, and other data. The other data may include for example, weather data (current, historic, and forecast), machine maintenance and repair data, site data such as survey information or soil test information, and other data known in the art.

The controller 28 may generate an analysis of the data collected from one or more of onsite and offsite sensors and present results of the analysis to a user of the worksite management system 26 and/or to the operators of particular machines thereof by way of the communications interface 38, for example. The results may include a productivity analysis, an economic analysis (e.g., efficiency, fuel economy, operational cost, etc.), a cycle time analysis, an environmental analysis (e.g., engine emissions, road conditions, site conditions, etc.), or other analysis specific to each machine, each category of machines (e.g., digging machines, loading machines, hauling machines, etc.), each co-located machine, each operator associated with the machines, and/or for the worksite as a whole. In one aspect, results of the analysis may be indexed according to time, for example, according to a particular shift, a particular 24-hr period, or another suitable parameter (e.g., time period, liters of fuel, cost, etc.).

The results of the analysis may be in the form of detailed reports or they may be summarized as a visual representation such as, for example, with an interactive graph. The results may be used to show a historical performance, a current performance, and/or an anticipated performance of the machines operating at the worksite. Alternatively or additionally, the results could be used to predict a progression of operations at the worksite and to estimate a time before the productivity, efficiency, or other performance measure of a particular machine, operator, group of machines, or the worksite becomes irregular (i.e., exceeds or falls below a desired or expected limit). As an example, the results of the analysis may indicate when a performance irregularity has occurred, is currently occurring, or anticipated to occur in the future. The controller 28 may flag the user of the worksite management system 26 at the time of the irregularity occurrence or during the analysis stage when the irregularity is first detected and/or anticipated.

For the purposes of this disclosure, a performance irregularity may be defined as a non-failure deviation from a modeled performance such as historical, expected, or desired machine or worksite performance (e.g., productivity, efficiency, emission, traffic congestion, or similar related performance) that is monitored, calculated, or otherwise received by the worksite management system 26 or other system. In one aspect, an amount of deviation required for the irregularity classification may be set by a machine operator, a user of the worksite management system 26, a business owner, or other responsible entity. In some situations, the performance irregularity may be indicative of a site condition over which little control may be exercised, but that may still be accommodated to improve operations at the worksite.

Based on the analysis, when a performance irregularity has been determined to have occurred, be currently occurring, or is anticipated to occur, the controller 28 may be configured to remotely reconfigure an operational relationship of particular machines and thereby positively affect the performance irregularity. The operational relationship may be associated with, for example, the shift points included within a transmission map, engine valve and/or ignition timings included within an engine calibration map, fuel settings included within a torque limit map, maximum or minimum speed limits included within a travel limit map, steering boundaries included within a steering map, pressure and/or priority settings included within a tool actuation map, or other similar settings, limits, and/or boundaries contained within other software maps, algorithms, and/or equations stored electronically within memory (e.g., a memory of the control module 20 (FIG. 2)). In general, reconfiguring the operational relationships described above may affect how a particular machine responds to different situations. For example, reconfiguring the shift points of a transmission map may control the engine speed and/or wheel torques at which a transmission of a particular machine shifts to a lower or higher gear combination. Similarly, changing engine valve and/or ignition timings of an engine calibration map may control under what conditions intake and/or exhaust valves open or close, at what point within an engine cycle the combustion gas is energized, and resulting engine cylinder pressures and emissions. These changes to the operational relationships of the hauling machine 16 may be implemented to improve productivity, efficiency, and emissions, or otherwise positively affect the performance irregularity, and may be maintained within the software maps, algorithms, and/or equations until a subsequent reconfiguration is implemented. In other words, reconfiguration of a machine's operational relationship may be semi-permanent and affect subsequent machine performance for an extended period of time. Examples of reconfiguration implementation will be provided in the following section.

Figure 5:
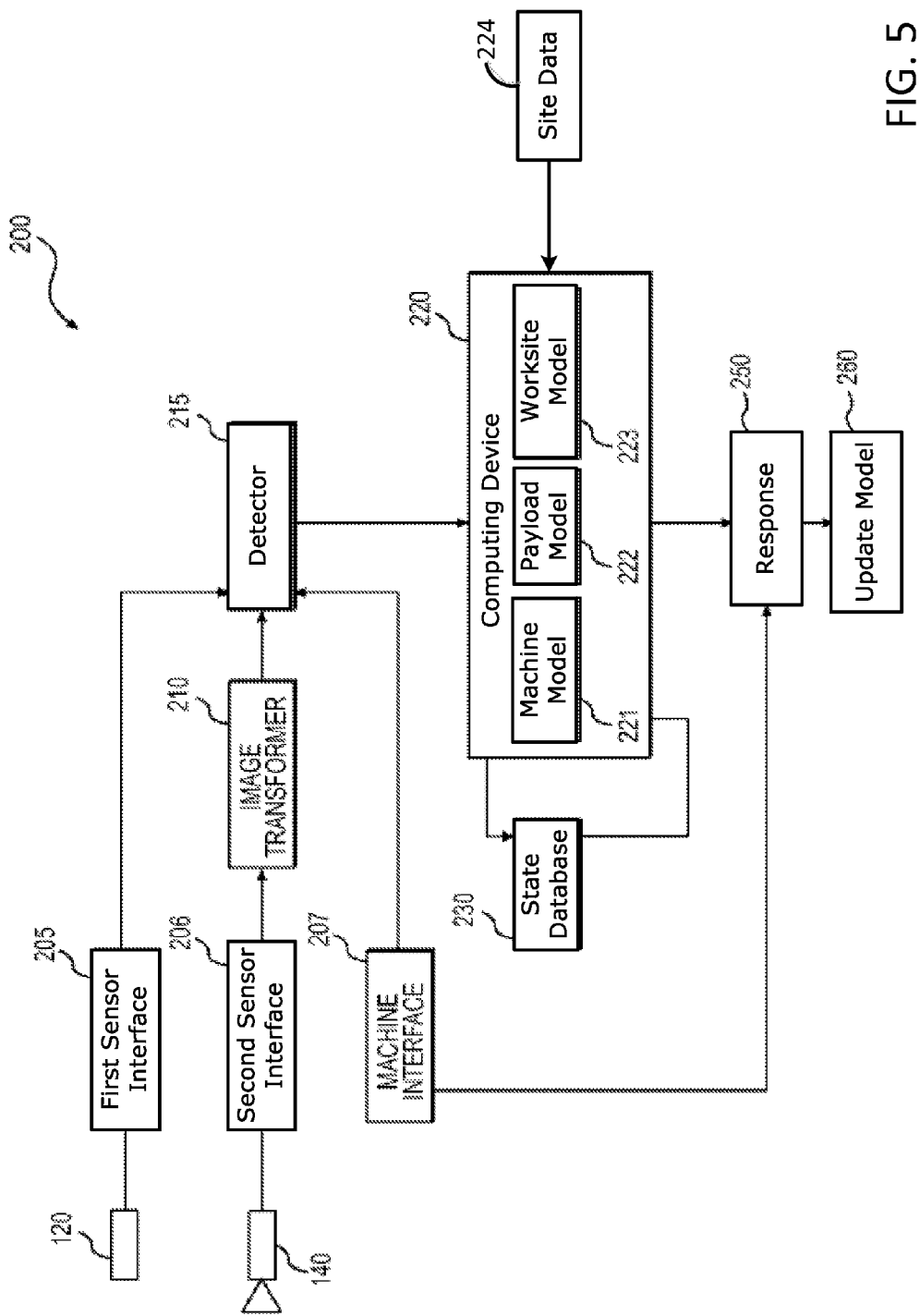
FIG. 5 illustrates a block diagram of an exemplary system and data flow in accordance with aspects of the disclosure.

FIG. 5 is a block diagram illustrating an exemplary system 200 that may be installed on the machine 110 or in communication with the machine 110 to detect and recognize features of objects in the environment of the machine 110. The system 200 may include one or more modules that when combined perform object detection and recognition. For example, as illustrated in FIG. 5, the system 200 may include a first sensor interface 205, a second sensor interface 206, a machine interface 207, an image transformer 210, a detector 215, a computing device 220, a state database 230, and a response module 250. While FIG. 5 shows components of system 200 as separate blocks, those skilled in the art will appreciate that the functionality described below with respect to one component may be performed by another component, or that the functionality of one component may be performed by two or more components. For example, the functionality of detector 215 may be performed by the computing device 220, or the functionality of image transformer 210 may be performed by two components.

In certain aspects, the modules of the system 200 described above may include logic embodied as hardware, firmware, or a collection of software written in a known programming language. The modules of system 200 may be stored in any type of computer-readable medium, such as a memory device (e.g., random access, flash memory, and the like), an optical medium (e.g., a CD, DVD, BluRay®, and the like), firmware (e.g., an EPROM), or any other storage medium. The modules may be configured for execution by one or more processors to cause the system 200 to perform particular operations. The modules of the system 200 may also be embodied as hardware modules and may include connected logic units, such as gates and flip-flops, and/or may include programmable units, such as programmable gate arrays or processors, for example.

The system 200 may include one or more of the first sensors 120 and one or more of the second sensors 140. The first sensors 120 may correspond to one or more of the first sensors 120a-120h and the second sensors 140 may correspond to one or more of the second sensors 140a-140d, for example. Moreover, while only one of the first sensors 120 and one of the second sensors 140 are shown in FIG. 5, those skilled in the art will appreciate that any number of sensors may be included in the system 200.

In some aspects, before the system 200 may process sensor data from the first sensor 120 and sensor data from the second sensor 140, the sensor data must be converted to a format that is consumable by the modules of system 200. Accordingly, the first sensor 120 may be connected to a first sensor interface 205, and the second sensor 140 may be connected to a second sensor interface 206. The first sensor interface 205 and the second sensor interface 206 may receive analog signals from their respective devices and convert them to digital signals which may be processed by the other modules of the system 200. For example, the first sensor interface 205 may create digital RADAR or audio data using information it receives from the first sensor 120, and second sensor interface 206 may create digital image data using information it receives from the second sensor 140. Other data may be generated based on the respective type of sensor. In certain aspects, the first sensor interface 205 and the second sensor interface 206 may package the digital data in a data package or data structure along with metadata related to the converted digital data. For example, the first sensor interface 205 may create a data structure or data package that has metadata and a payload representing the radar data from the first sensor 120. Non-exhaustive examples of metadata related to the sensor data may include the orientation of the first sensor 120, the position of the first sensor 120, and/or a time stamp for when the sensor data was recorded. Similarly, the second sensor interface 206 may create a data structure or data package that has metadata and a payload representing image data from the second sensor 140. Non-exhaustive examples of metadata related to the image data may include the orientation of the second sensor 140, the position of the second sensor 140 with respect to machine 110, the down-vector of the second sensor 140, a time stamp for when the image data was recorded, and a payload field representing the image data from the second sensor 140.

In certain aspects, the first sensor 120 and the second sensor 140 may be digital devices that produce data, and the first sensor interface 205 and the second sensor interface 206 may package the digital data into a data structure for consumption by the other modules of the system 200. The first sensor interface 205 and the second sensor interface 206 may expose an application program interface (API) that exposes one or more function calls allowing the other modules of the system 200, such as the detector 215, to access the sensor data.

In certain aspects, the system 200 may include a machine interface 207 the may communicate with one or more sensors deployed on machine 110 and may translate signals from the one or more sensors to digital data that may be consumed by the modules of the system 200. The digital data may include operational state data that includes information related to machine's 110 current operation. For example, the operational state data may include the current speed of the machine 110, the current direction of the machine 110 (e.g., forward or backward), the current steering angle of the machine 110, the acceleration of the machine 110, a deformation of a portion of the machine 110, a location of the machine 110, a state of a component of the machine such as a valve, actuator, spring, or other state of the device. The operational state data may also include information about tools or other work components of the machine 110. For example, the operational state data may include the position of loading or digging arms, or the angle/position of a load bed attached to the machine 110. The operational state data may also include metadata such as a time stamp or an identifier of the tool or work component to which the operational state data applies. The machine interface 207 may expose an API providing access to the operational state data of the machine 110 to the modules of the system 200, such as the response module 250 and the detector 215.

The detector 215 may be configured to accesses or receive data from the first sensor interface 205 and the second sensor interface 206 and processes it to detect features of objects that are in the environment of the machine 110. The data accessed from the first sensor interface 205 may include an indication that a material load (e.g., payload) was detected in the environment of the machine 110. The detector 215 may access such data by periodically polling the first sensor interface 205 for sensor data and analyzing the data to determine if the data indicates the presence of the material load and/or any identifiable features of the material load. The detector 215 may also access the data through an event or interrupt triggered by the first sensor interface 205. For example, when the first sensor 120 detects an object, it may generate a signal that is received by the first sensor interface 205, and the first sensor interface 205 may publish an event to its API indicating that the first sensor 120 has detected an object. The detector 215, having registered for the event through the API of the first sensor interface 205, may receive the data and analyze the data to determine whether an object such as a material load has been detected. As an illustrative example, once the presence of a material load has been detected via radar, for example, the detector 215 may access image data through the second sensor interface 206 and process the image data to determine the type of material and/or other material characteristics such as material to air ratio. As another illustrative example, the first sensors 120 may detect an audible sound and the detector 215 may access image data through the second sensor interface 206 in response to the detection of the sound. As a further illustrative example, the first sensors 120 may be offsite and may detect an operational condition (e.g., worksite event) that needs further investigation. As such, the detector 215 may access image data through the second sensor interface 206 in response to the detection of the operational condition.

As processing image data is computationally expensive, the detector 215 may advantageously limit the amount of image data that is processed by using data accessed or received via the first sensor 120 or first sensor interface 205. The data accessed or received via the first sensor 120 or first sensor interface 205 may be used, for example, to limit processing to the parts of the image data where a particular feature is expected. For example, the detector 215 may map accessed first sensor data to accessed second sensor data and only process the portions of the second sensor data that correspond to a particular feature of interest. The detector 215 may map various data sets using metadata related to the orientation and position of the first sensor 120 and the second sensor 140. For example, when the detector 215 receives data from the first sensor 120 positioned on the rear of machine 110, it may map that data to data from the second sensor 140 that is also positioned on the rear of machine 110.

The detector 215 may also process image data to detect features within the image data. The detector 215 may detect features in the image by using edge detection techniques. For example, the detector 215 may analyze the image data for places where image brightness changes sharply or has discontinuities. The detector 215 may employ a known edge detection technique such as a Canny edge detector. Although edge detection is one method by which the detector 215 may detect features in images, those skilled in the relevant art will appreciate that other methods for detecting objects in image data may be used to achieve the same effect.

When the detector 215 detects a feature in the received data, it may provide detected feature data to the computing device 220 to classify the detected feature according to a classification model. The detected feature data provided by the detector 215 may include metadata related to the detected feature. Non-exhaustive examples of metadata for the detected feature data may include the position of the feature within the image data, the distance of the detected feature from the first sensor 120, and/or the angular position of the detected feature. The detected feature data may include the output of edge detection, that is, image data that describes the shape of the feature, for example. Once the computing device 220 receives the detected feature data it may compare the feature to learned or known signatures.

As the computing device 220 may rely on the shape of detected features, the format and orientation of the images recorded by the second sensor 140 may affect accuracy. For example, the second sensor 140 may be a wide-angle top-down view camera, birds-eye view camera, fisheye camera, or some other camera that produces an image that is from a perspective other than a ground level perspective. As a result, the images produced by the second sensor 140 may include objects oriented on their sides as opposed to upright. Accordingly, in certain aspects, the system 200 may include an image transformer 210 that transforms image data received by the second sensor interface 206 so that the computing device 220 does not need to account for object orientation when classifying an object.

In an aspect, the computing device 220 may use one or more classification models to determine the type of feature detected by the detector 215. For example, as illustrated in FIG. 5, the computing device 220 may use a machine model 221, a payload model 222, or a worksite model 223 to classify a detected features as a piece of equipment, a machine in a particular state, a type of payload material, a characteristic of material, and/or as a normal operation or irregular/inefficient operation. As an example, the computing device 220 may compare the detected feature data to the classification models and determine whether the detected feature data is consistent with parameters of the classification model.

In an aspect, a state database 230 may include information relating to one or more known and/or catalogued machine state signatures (e.g., models). Such signatures may represent various data types such as image, audio, RADAR, LIDAR, thermal, infrared, etc. Such signatures may be catalogued to represent specific identifiable machine states. For example, a specific audio sound may be stored as an audio signature for a particular machine operation such as a loading or dumping operation. As another example, a specific image may be stored as an image signature representing a full load for a particular machine. As another example, a specific image may represent best practices, safety protocols, or a regular/normal operation for a particular machine. Such signatures may be manually catalogued or may be processed on large data sets (e.g., via machine learning) to generate a predictor that represents the identifiable signature.

The signatures may be compared to subsequent data (e.g., detected feature data) to determine if the subsequent data matches any of the signatures. As such, the computing device 220 may classify newly received data as a particular machine state based on the comparison with the signatures (e.g., model). As a further example, the computing device 220 may process site data 224 for comparison with the detected feature data to determine a matching signature of a machine state. Classification of data relating to machine operations may include classifying certain operations as normal/regular and others as irregular. Using the stored signatures of learned patterns, the classification process may be used to detect when site operations are normal or within safety parameters and when certain operations are irregular or outside safety protocols. In an aspect, image signatures may help to identify machine state in situations where machine is being used in a non-typical manner, such as a dozer being used to load a truck. Conventional sensor techniques may not be configured to disambiguate the overall process without the inclusion of the image signature.

In an aspect, the site data 224 may include performance information such as information relating to the theoretical or projected performance characteristics of the machines operating at the worksite. As examples, performance information may include a projected loading rate of the loading machine (e.g., tons loaded per hour), a projected processing rate of a processing machine (e.g., tons processed per hour), a projected carrying capacity of the hauling machine (e.g., tons of material per load), a projected maximum safe travel speed of the hauling machine or the like. Performance information may also include projected performance metrics relating to the cooperative operation of more than one machine. For example, performance information may include the projected amount of time that the loading machine should take to fill the bed of a particularly-sized hauling machine. As another example, performance information may include the projected cycle time of a complete cycle of the loading machine filling the hauling machine, the hauling machine delivering its payload to a processing machine, and the hauling machine returning again to the loading machine.

The site data 224 may include information pertaining to the roads of the worksite. For example, this may include information on the material composition of a road (e.g., paved, dirt, mud or the like). Road information may also include the weight-bearing capacity of a road (e.g., 100 tons), the maximum speed at which machines may safely operate on a road, or a metric indicating the level of deterioration of a road. The site data 224 may include a designation of a hauling route over one or more roads.

The site data 224 may include cost-related information. Cost-related information may include a purchase cost of a machine, a lease cost of a machine, an operating cost of a machine (e.g., fuel, wear-and-tear deterioration) or the like. Other cost-related information may include wage costs for personnel associated with the worksite, including those personnel operating the machines. Cost-related information may additionally include road construction cost, road maintenance cost, and power costs such as for electricity or natural gas. As a further example, the site data 224 may include information pertaining to site goals. For example, site goal information may include a goal cost of operation or a goal productivity level (e.g., a particular amount of material processing in a specified period of time).

The site data 224 may include a worksite model 223 representing the historical, current, and/or predictive operations of a worksite, including one or more operations of a machine (e.g., machines 12, 14, 16 (FIG. 1)). For example, and referring back to the exemplary worksite 10 depicted in FIG. 1, the worksite model 223 may simulate the operation of the loading machine 14 depositing a material into the hauling machine 16. The worksite model 223 may, in turn, simulate the laden hauling machine 16 traveling along a road and unloading its payload to a processing machine, wherein the delivered material is simulated being processed. The worksite model 223 may then simulate the empty hauling machine 16 traveling back over the road to repeat the process. The site simulation may be determined by the controller 28 or other processor. For example, the site simulation may be determined at a server or other processor controlled by a third-party and subsequently delivered to and received by the controller 28.

In certain aspects, site analytics are performed. Site analytics may be performed, for example via the computing device 220, to identify a current inefficiency, predict an future inefficiency, or identify a recreated historical inefficiency at the worksite, for example, based on one or more of the models and/or the site data 224. An inefficiency may relate to any aspect of the operations of the worksite and may include an exceeding of a pre-specified threshold relating to that aspect. As used herein, exceeding of a pre-specified threshold may refer to either a numerical aspect being greater than a pre-specified threshold or less than a pre-specified threshold, according to the context of usage. Examples of an inefficiency may include an indication that the hauling machines are sitting idle for a time period exceeding a threshold (e.g., longer than one minute) while waiting for the loading machine to finish loading its current load or an indication that the hauling machines on a road are traveling below a threshold relating to their maximum safe speed (e.g., less than twenty miles per hour) due to traffic congestion on the road. Other examples may include an indication that the worksite is processing less material than projected, an indication that a machine is consuming more fuel than projected, or an indication that the hauling machine is having a longer loading/unloading cycle time than projected. Note that the aforementioned examples apply equally in the predictive sense, e.g., predicting that the hauling machines will sit idle, and in the historical sense, e.g., identifying that the hauling machines were sitting idle.

Site analytics may additionally include identifying a factor which may contribute to or may have contributed to an identified current inefficiency, an identified future inefficiency, or an identified historical inefficiency. For example, if an identified inefficiency includes an indication that the hauling machine is sitting idle while waiting for the loading machine for a period beyond a pre-specified threshold, the site analytics may identify a factor contributing to the idleness, such as the loading machine not capturing a full shovel of material. In an aspect, such mixed fleet analytics incorporating in-network and out-of-network machines facilities macro-level analysis at the fleet level, or job-level, or multi-machine level, while machine-centric data such as localized video analytics may provide a micro-level analysis. As an example, certain machines work in tandem, such as a tractor pushing a scraper on an earthworks jobsite. Mixed fleet analytics may be used for a macro-level analysis of the operation including the tandem machines working together to move earth. Additionally, micro-level analytics may be used to analyze each individual machine to measure how much earth is being filled in a bucket, for example.

In an aspect, based upon the classification of the computing device 220, the response module 250 may generate a response. The response may be generated and further transmitted by a central location (e.g., the central station 18 (FIG. 1)) or by a device on a machine, for example. A response may include an instruction relating to an inefficiency identified by the computing device 220. The response may include an electronic communication (e.g., email, short message service (SMS) text message, or text file). The generated response may include a warning, for example, to an operator, foreman, site supervisor, or administrator. The warning may include a visual indicator such as a message or icon to be displayed on a display system and directed towards an operator or other personnel at the worksite. The instruction or warning may include on variable level of severity.

In an aspect, based upon the classification of the computing device 220, a module 260 may be configured to update one or more of the models 221, 222, 223. This may include transmitting update classification, signatures, learned correlations, and the like, which was not included in the previous model. This may additionally include transmitting an inefficiency or factor contributing to an inefficiency identified in the site analytics of the computing device 220 so that the inefficiency or factor may be incorporated into an updated model.

INDUSTRIAL APPLICABILITY

The industrial applicability of the System, methods, and computer readable medium for determining machine states at an mixed fleet worksite (e.g., construction site, minesite, etc.) using at least video and/or audio analytics herein described will be readily appreciated from the foregoing discussion. Although various machines 12, 14, 16 are described in relation to FIG. 1, those skilled in the art may understand that the machine 12, 14, 16 is not so limited and may include any manner of work vehicle or equipment that may be found at a worksite. Similarly, although the hauling machine 16 is depicted in FIG. 2, any type of work vehicle or equipment may be used.

Figure 6:
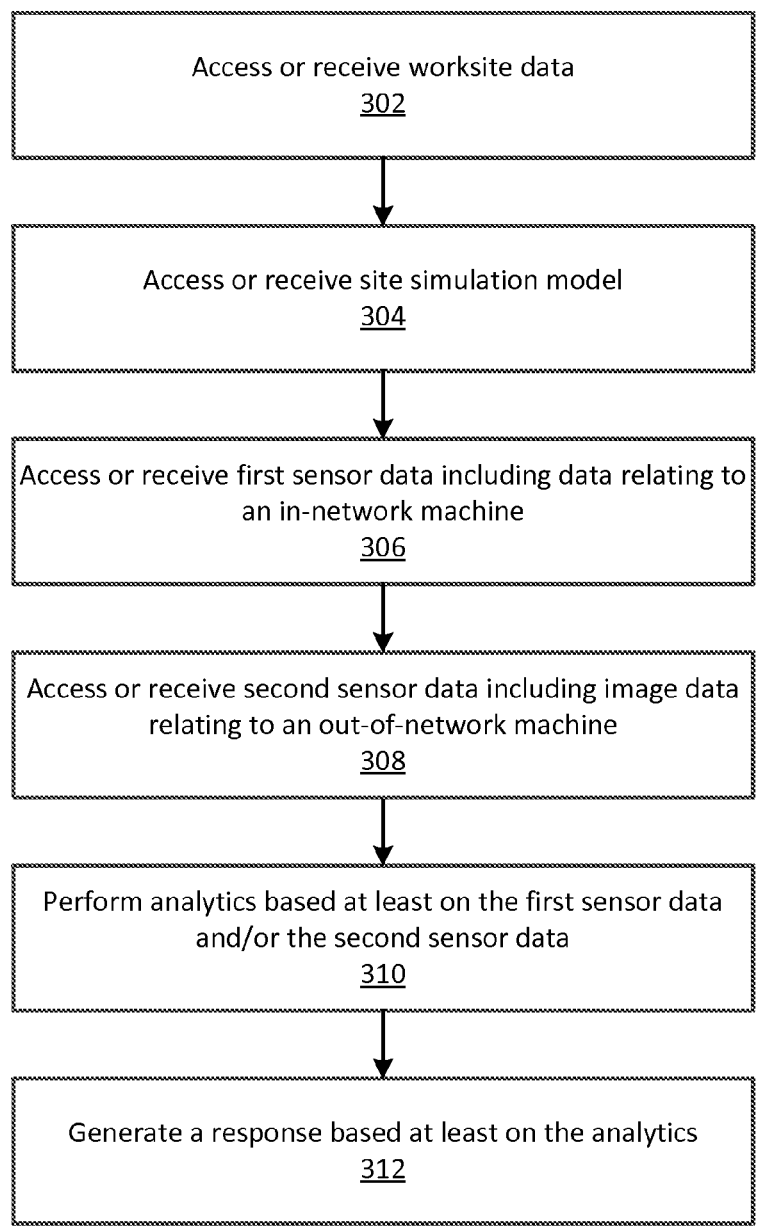
FIG. 6 illustrates an exemplary method in accordance with aspects of the disclosure.

FIG. 6 illustrates a process flow chart for a method 300 for worksite operation optimization based on determining machine state of a mixed fleet at a worksite. For illustration, the operations of the method 300 will be discussed in reference to FIGS. 1-5. At step 302, site data 224 may be received. As an example, site data 224 may be received by the computing device 220 (e.g., central station 18). The site data 224 may be previously stored on the computing device 220 or may be received from another server or processor, including one associated with a third party. The site data 224 may include theoretical or projected performance characteristics of machines 12, 14, 16 operating at the worksite 10 (e.g., a projected loading rate of the loading machine 14) or performance characteristics of machines 12 operating in conjunction (e.g., a cycle time of the loading machine 14 loading the hauling machine 16, the hauling machine 16 traveling to a processing machine, and the processing machine receiving the hauling machine's 110 payload). The site data 224 may include data on a road of the worksite 10, such as the expected material composition, layout, weight-bearing capacity, maximum speed, or a metric indicating a level of deterioration of the road. The site data 224 may additionally include cost-related data, such as the purchase or lease cost of a machine 12, 14, 16, wage costs for operators or other personnel, road costs, or power costs. The site data 224 may include site goal data, such as a goal for cost of operation or productivity level for the worksite 10.

At step 304, a model such as the machine model 221, payload model 222, and/or worksite model 223 may be received. The model may be received or accessed by the computing device 220, for example, after the model is determined based, at least in part, on the site data 224 or stored models (e.g., signatures) via the state database 230. The determination of the model may be performed by the computing device 220 or another processor, including one controlled by a different party than that controlling the computing device 220.

At step 306, first sensor data may be received by, for example, from one or more of the first sensors 120. As an example, the first sensor data is received by the computing device 220, directly or indirectly, and may be pre-processed by other components such as the detector 215. The first sensor data may comprise sensor data such as audio, video, infrared, RADAR, LIDAR, thermal, and the like. The first sensor data may relate to an in-network machine of the machine 12, 14, 16 (FIG. 1).

At step 308, second sensor data may be received by, for example, from one or more of the second sensors 120. As an example, the second sensor data is received by the computing device 220, directly or indirectly, and may be pre-processed by other components such as the detector 215. The second sensor data may include sensor data such as audio, video, infrared, RADAR, LIDAR, thermal, and the like. In certain aspects, the second sensor data is received from a different type of sensor from the first sensor data. As an example, the first sensor data may be audio data and the second sensor data may be image data. As another example, the first sensor data may be received from an offsite sensor, while the second sensor data is received from an onsite sensor. In other aspect, the second sensor data may relate to an out-of-network machine of the machines 12, 14, 16 (FIG. 1).

At step 310, site analytics are performed by, for example, the computing device 220. The site analytics may be performed based on received site data 224 and/or models. Site analytics may include identifying and classify normal operations and irregular operations. Site analytics may be used to detect a current inefficiency, predicting a future inefficiency, or identifying a historical inefficiency at the worksite 10. An inefficiency may relate to an aspect of the operations of the worksite 10 and may be determined by data relating to that aspect exceeding a pre-specified threshold. Examples of an inefficiency may include an indication that the hauling machines 16 are sitting idle for a time period exceeding a threshold (e.g., longer than one minute) while waiting for the loading machine 14 to finish loading its current load or an indication that the hauling machines 16 on a road are traveling below a threshold relating to their maximum safe speed (e.g., less than twenty miles per hour) due to traffic congestion on the road. Site analytics may additionally include identifying a factor which may contribute to or may have contributed to an identified current inefficiency, an identified future inefficiency, or an identified historical inefficiency.

At step 312, a response is generated by, for example, the response module 250 based on the site analytics. A response may include an instruction relating to an operator warning condition such as an inefficiency or factor contributing to an inefficiency and may be embodied in an electronic communication such as an email, SMS text message, or text file. The response may be configured to result in a remediation of the operator warning condition. A response may also include a warning directed to, for example, an operator. A warning may include an electronic communication such as an email, SMS text, or text file or may include an electronic instruction for a warning light to be lit or an audio alarm to be sounded, for example.

The generated response may further be transmitted to, for example, a display system (e.g., operator interface module 22) of a machine 12, 14, 16, so that the operator may be apprised of an instruction or warning. The response may additionally be transmitted to another electronic device, such as a smartphone, tablet computer, laptop, or personal computer of the operator or other worksite 10 personnel (e.g., foreman or supervisor). The response may be transmitted by, for example, the central station 18. The response may be used to update one or more of the site data 224 and/or the models 221, 222, 223. As an example, the second sensor data may relate to an out-of-network machine and such data may be used to supplement a model relating to a mixed fleet worksite.

Whether such functionality is implemented as hardware or software depends upon the design constraints imposed on the overall system. Skilled persons may implement the described functionality in varying ways for each particular application, but such implementation decisions should not be interpreted as causing a departure from the scope of the disclosure. In addition, the grouping of functions within a module, block, or step is for ease of description. Specific functions or steps may be moved from one module or block without departing from the disclosure.

The various illustrative logical blocks and modules described in connection with the aspects disclosed herein may be implemented or performed with a general purpose processor, a digital signal processor (DSP), application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor (e.g., of a computer), or in a combination of the two. A software module may reside, for example, in RAM memory, flash memory, ROM memory, EPROM memory, EEPROM memory, registers, hard disk, a removable disk, a CD-ROM, or any other form of storage medium. An exemplary storage medium may be coupled to the processor such that the processor may read information from, and write information to, the storage medium. In the alternative, The storage medium may be integral to the processor. The processor and the storage medium may reside in an ASIC.

In at least some aspects, a processing system (e.g., control module 20, controller 28, etc.) that implements a portion or all of one or more of the technologies described herein may include a general-purpose computer system that includes or is configured to access one or more computer-accessible media.

Figure 7:
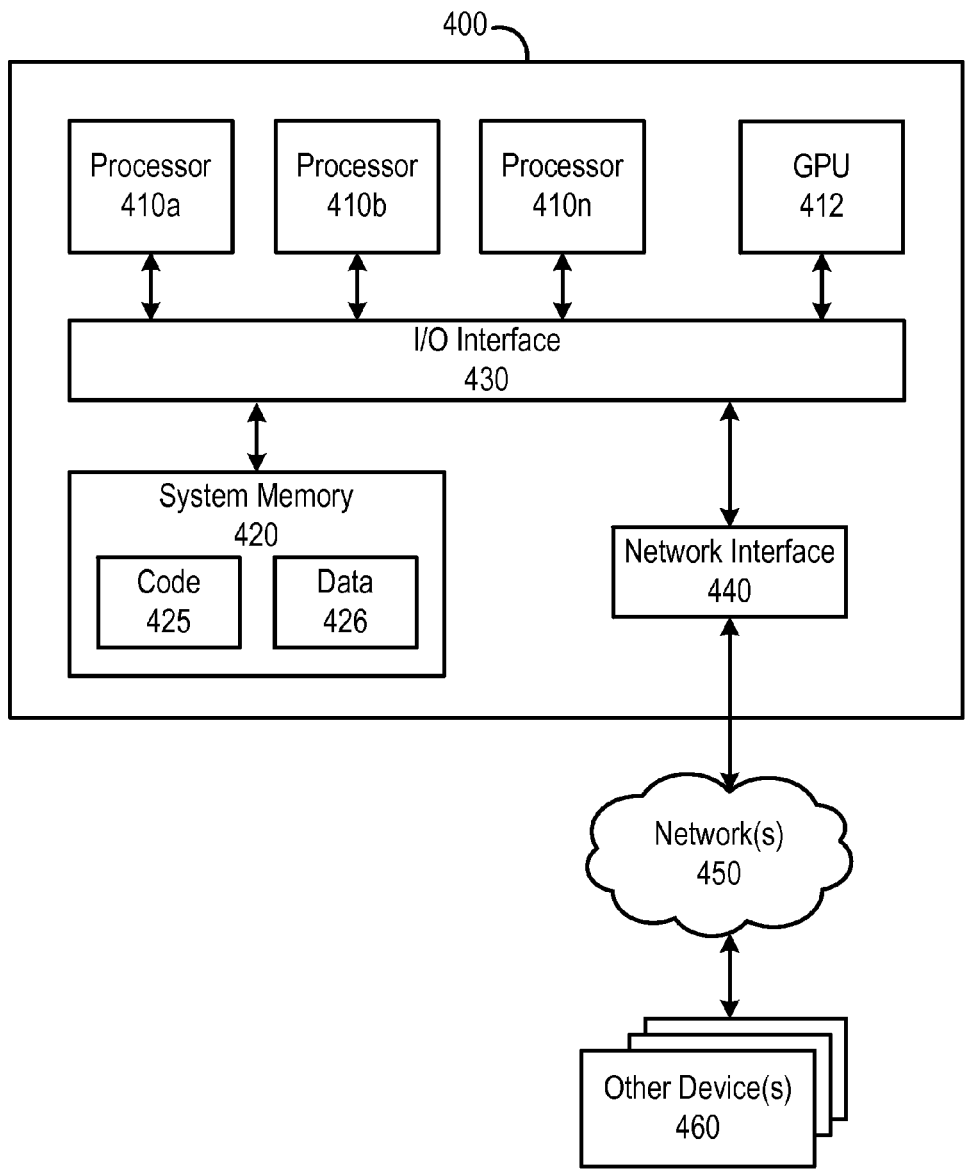
FIG. 7 illustrates a block diagram of a computer system configured to implement the method of FIG. 6.

FIG. 7 depicts a general-purpose computer system that includes or is configured to access one or more computer-accessible media. In the illustrated aspect, a computing device 400 may include one or more processors 410a, 410b, and/or 410n (which may be referred herein singularly as the processor 410 or in the plural as the processors 410) coupled to a system memory 420 via an input/output (I/O) interface 430. The computing device 400 may further include a network interface 440 coupled to an I/O interface 430.

In various aspects, the computing device 400 may be a uniprocessor system including one processor 410 or a multiprocessor system including several processors 410 (e.g., two, four, eight, or another suitable number). The processors 410 may be any suitable processors capable of executing instructions. For example, in various aspects, the processor(s) 410 may be general-purpose or embedded processors implementing any of a variety of instruction set architectures (ISAs), such as the x86, PowerPC, SPARC, or MIPS ISAs, or any other suitable ISA. In multiprocessor systems, each of the processors 410 may commonly, but not necessarily, implement the same ISA.

In some aspects, a graphics processing unit ("GPU") 412 may participate in providing graphics rendering and/or physics processing capabilities. A GPU may, for example, include a highly parallelized processor architecture specialized for graphical computations. In some aspects, the processors 410 and the GPU 412 may be implemented as one or more of the same type of device.

The system memory 420 may be configured to store instructions and data accessible by the processor(s) 410. In various aspects, the system memory 420 may be implemented using any suitable memory technology, such as static random access memory ("SRAM"), synchronous dynamic RAM ("SDRAM"), nonvolatile/Flash®-type memory, or any other type of memory. In the illustrated aspect, program instructions and data implementing one or more desired functions, such as those methods, techniques and data described above, are shown stored within the system memory 420 as code 425 and data 426.

In one aspect, the I/O interface 430 may be configured to coordinate I/O traffic between the processor(s) 410, the system memory 420 and any peripherals in the device, including a network interface 440 or other peripheral interfaces. In some aspects, the I/O interface 430 may perform any necessary protocol, timing or other data transformations to convert data signals from one component (e.g., the system memory 420) into a format suitable for use by another component (e.g., the processor 410). In some aspects, the I/O interface 430 may include support for devices attached through various types of peripheral buses, such as a variant of the Peripheral Component Interconnect (PCI) bus standard or the Universal Serial Bus (USB) standard, for example. In some aspects, the function of the I/O interface 430 may be split into two or more separate components, such as a north bridge and a south bridge, for example. Also, in some aspects some or all of the functionality of the I/O interface 430, such as an interface to the system memory 420, may be incorporated directly into the processor 410.

The network interface 440 may be configured to allow data to be exchanged between the computing device 400 and other device or devices 460 attached to a network or networks 450, such as other computer systems or devices, for example. In various aspects, the network interface 440 may support communication via any suitable wired or wireless general data networks, such as types of Ethernet networks, for example. Additionally, the network interface 440 may support communication via telecommunications/telephony networks, such as analog voice networks or digital fiber communications networks, via storage area networks, such as Fibre Channel SANs (storage area networks), or via any other suitable type of network and/or protocol.

In some aspects, the system memory 420 may be one aspect of a computer-accessible medium configured to store program instructions and data as described above for implementing aspects of the corresponding methods and apparatus. However, in other aspects, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device the 400 via the I/O interface 430. A non-transitory computer-accessible storage medium may also include any volatile or non-volatile media, such as RAM (e.g., SDRAM, DDR SDRAM, RDRAM, SRAM, etc.), ROM, etc., that may be included in some aspects of the computing device 400 as the system memory 420 or another type of memory. Further, a computer-accessible medium may include transmission media or signals, such as electrical, electromagnetic or digital signals, conveyed via a communication medium, such as a network and/or a wireless link, such as those that may be implemented via the network interface 440. Portions or all of multiple computing devices, such as those illustrated in FIG. 7, may be used to implement the described functionality in various aspects; for example, software components running on a variety of different devices and servers may collaborate to provide the functionality. In some aspects, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

It should also be appreciated that the systems in the figures are merely illustrative and that other implementations might be used. Additionally, it should be appreciated that the functionality disclosed herein might be implemented in software, hardware, or a combination of software and hardware. Other implementations should be apparent to those skilled in the art. It should also be appreciated that a server, gateway, or other computing node may include any combination of hardware or software that may interact and perform the described types of functionality, including without limitation desktop or other computers, database servers, network storage devices and other network devices, PDAs, tablets, cellphones, wireless phones, pagers, electronic organizers, Internet appliances, and various other consumer products that include appropriate communication capabilities. In addition, the functionality provided by the illustrated modules may in some aspects be combined in fewer modules or distributed in additional modules. Similarly, in some aspects the functionality of some of the illustrated modules may not be provided and/or other additional functionality may be available.

Each of the operations, processes, methods, and algorithms described in the preceding sections may be embodied in, and fully or partially automated by, code modules executed by at least one computer or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto may be performed in other sequences that are appropriate. For example, described blocks or states may be performed in an order other than that specifically disclosed, or multiple blocks or states may be combined in a single block or state. The exemplary blocks or states may be performed in serial, in parallel, or in some other manner. Blocks or states may be added to or removed from the disclosed example aspects. The exemplary systems and components described herein may be configured differently than described. For example, elements may be added to, removed from, or rearranged compared to the disclosed example aspects.

It will also be appreciated that various items are illustrated as being stored in memory or on storage while being used, and that these items or portions of thereof may be transferred between memory and other storage devices for purposes of memory management and data integrity. Alternatively, in other aspects some or all of the software modules and/or systems may execute in memory on another device and communicate with the illustrated computing systems via inter-computer communication. Furthermore, in some aspects, some or all of the systems and/or modules may be implemented or provided in other ways, such as at least partially in firmware and/or hardware, including, but not limited to, at least one application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other aspects. Accordingly, the disclosure may be practiced with other computer system configurations.

Conditional language used herein, such as, among others, "may," "could," "might," "may," "e.g.," and the like, unless specifically stated otherwise, or otherwise understood within the context as used, is generally intended to convey that certain aspects include, while other aspects do not include, certain features, elements, and/or steps. Thus, such conditional language is not generally intended to imply that features, elements, and/or steps are in any way required for at least one aspects or that at least one aspects necessarily include logic for deciding, with or without author input or prompting, whether these features, elements, and/or steps are included or are to be performed in any particular aspect. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example aspects have been described, these aspects have been presented by way of example only, and are not intended to limit the scope of aspects disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of aspects disclosed herein. The accompanying claims and their equivalents are intended to cover such forms or modifications as would fall within the scope and spirit of certain aspects disclosed herein.

The preceding detailed description is merely exemplary in nature and is not intended to limit the disclosure or the application and uses of the disclosure. The described aspects are not limited to use in conjunction with a particular type of machine. Hence, although the present disclosure, for convenience of explanation, depicts and describes particular machine, it will be appreciated that the assembly and electronic system in accordance with this disclosure may be implemented in various other configurations and may be used in other types of machines. Furthermore, there is no intention to be bound by any theory presented in the preceding background or detailed description. It is also understood that the illustrations may include exaggerated dimensions to better illustrate the referenced items shown, and are not consider limiting unless expressly stated as such.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

The disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), Long Term Evolution (LTE), W-CDMA (Wideband Code-Division Multiple Access), Wireless Fidelity (Wi-Fi), Bluetooth, and/or the like, and/or a combination of two or more thereof.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context.

We claim:

1. A method for managing mixed-fleet worksites, comprising:
    receiving, by one or more processors of a central station, one or more models relating to a worksite or a fleet of machines at the worksite, the fleet of machines including an in-network machine configured to communicate with the central station, and an out-of-network machine that is not configured to communicate with the central station;
    receiving, by the one or more processors of the central station, first sensor data associated with the out-of-network machine at the worksite, the first sensor data comprising one or more of image data and audio data;
    receiving, by the one or more processors of the central station, second sensor data associated with the in-network machine at the worksite;
    determining, by the one or more processors, a machine state of each of the in-network machine and the out-of-network machine, the machine state of the out-of-network machine based at least on a comparison of a feature of an object detected in the image data of the first sensor data to a signature that represents a known or learned machine state, the machine state of the in-network machine based at least on the second sensor data, the machine state one of a full load, an empty load, a payload material type, a payload to air ratio, a payload placement, a payload compaction, a payload water content, a material amount moved, a drop placement, an excavator position, an idle state, a swing state, a dump position, a deformation of machine, an operator characteristic and a ground crew location relative to machine;
    comparing the determined machine states to a modeled machine state represented by the received one or more models to detect a non-failure irregularity in site operations or an inefficiency in site operations;
    generating a response based at least on the detected irregularity or inefficiency, the response including a warning or a remote reconfiguration of operational parameters of the in-network machine; and
    transmitting the response to an operator, a display at the worksite, or to the in-network machine,
    wherein the one or more models include a machine model, a payload model or a worksite model
    wherein the worksite includes a mining site or a construction site,
    wherein the out-of-network machine is an out-of-network digging machine, an out-of-network loading machine or an out-of-network hauling machine,
    wherein the in-network machine is an in-network digging machine, an in-network loading machine or an in-network hauling machine,
    wherein the out-of-network hauling machine and in-network hauling machine are each configured to carry excavated materials between different locations at the worksite.

2. A computer program product comprising a non-transitory storage medium having a computer readable program code embodied therein, the computer readable program code adapted to be executed to implement a method for managing a mixed-fleet worksite, the method comprising:
    receiving, by the one or more processors, one or more models relating to a worksite or a fleet of machines at the worksite, the fleet of machines including an in-network machine configured to communicate with a central station and an out-of-network machine that is not configured to communicate with the central station;
    receiving, by the one or more processors, first sensor data associated with the out-of-network machine at the worksite, the first sensor data comprising one or more of image data and audio data;
    receiving, by the one or more processors, second sensor data associated with the in-network machine at the worksite;
    determining, by the one or more processors, a machine state of each of the in-network machine and the out-of-network machine, the machine state of the out-of-network machine based at least on a comparison of a feature of an object detected in the image data of the first sensor data to a signature that represents a known or learned machine state, the machine state of the in-network machine based at least on the second sensor data, the machine state one of a full load, an empty load, a payload material type, a payload to air ratio, a payload placement, a payload compaction, a payload water content, a material amount moved, a drop placement, an excavator position, an idle state, a swing state, a dump position, a deformation of machine, an operator characteristic and a ground crew location relative to machine;

comparing the determined machine states to a modeled machine state represented by the received one or more models to detect a non-failure irregularity in site operations or an inefficiency in site operations;

generating a response based at least on the detected irregularity or inefficiency, the response including a warning or a remote reconfiguration of operational parameters of the in-network machine; and transmitting the response to an operator, a display at the worksite, or to the in-network machine, wherein the one or more models include a machine model, a payload model or a worksite model wherein the worksite includes a mining site or a construction site, wherein the out-of-network machine is an out-of-network digging machine, an out-of-network loading machine or an out-of-network hauling machine, wherein the in-network machine is an in-network digging machine, an in-network loading machine or an in-network hauling machine, wherein the out-of-network hauling machine and in-network hauling machine are each configured to carry excavated materials between different locations on the worksite.

3. The method of claim 1, wherein the one or more models comprises a worksite model and the method further comprises updating the worksite model based at least on the generated response.

4. The method of claim 1, wherein the first sensor data is received via an onsite sensor and the second sensor data is received via an offsite sensor.

5. The method of claim 1, wherein the first sensor data is received via an offsite sensor and the second sensor data is received via an onsite sensor.

6. The method of claim 1, wherein one or more of the determined machine state and the modeled machine state comprise a characteristic of a material load.

7. The method of claim 1, wherein the determining the machine state comprises generating a current signature representing the machine state.

8. The method of claim 1, wherein the response comprises one or more of an audible indicator and a visual indicator.

9. A system comprising:
a processor configured to
receive one or more models relating to a worksite or a fleet of machines at the worksite, the fleet of machines including an in-network machine configured to communicate with a central station and an out-of-network machine that is not configured to communicate with the central station;
receive first sensor data associated with the out-of-network machine at the worksite, the first sensor data comprising one or more of image data and audio data;
receive second sensor data associated with the in-network machine at the worksite;
determine a machine state of each of the in-network machine and the out-of-network machine, the machine state of the out-of-network machine based at least on a comparison of a feature of an object detected in the image data of the first sensor data to a signature that represents a known or learned machine state, the machine state of the in-network machine based at least on the second sensor data, the machine state one of a full load, an empty load, a payload material type, a payload to air ratio, a payload placement, a payload compaction, a payload water content, a material amount moved, a drop placement, an excavator position, an idle state, a swing state, a dump position, a deformation of machine, an operator characteristic and a ground crew location relative to machine; and
compare the determined machine states to a modeled machine state represented by the received one or more models to classify one or more site operations,
wherein the one or more models include a machine model, a payload model or a worksite model,
wherein the worksite includes a mining site or a construction site,
wherein the out-of-network machine is an out-of-network digging machine, an out-of-network loading machine or an out-of-network hauling machine,
wherein the in-network machine is an in-network digging machine, an in-network loading machine or an in-network hauling machine,
wherein the out-of-network hauling machine and in-network hauling machine are each configured to carry excavated materials between different locations at the worksite.

10. The system of claim 9, wherein the one or more models comprises a worksite model and the processor is further configured to update the worksite model based at least on the classified one or more site operations.

11. The system of claim 9, wherein the first sensor data is received via an onsite sensor and the second sensor data is received via an offsite sensor.

12. The system of claim 9, wherein the first sensor data is received via an offsite sensor and the second sensor data is received via an onsite sensor.

13. The system of claim 9, wherein one or more of the determined machine state and the modeled machine state comprise a characteristic of a material load.

14. The system of claim 9, wherein the determining the machine state comprises generating a current signature representing the machine state.

15. The computer readable program product of claim 2, wherein one or more of the determined machine state and the modeled machine state comprise a characteristic of a material load.

16. The computer readable program product of claim 2, wherein the first sensor data is received via an onsite sensor and the second sensor data is received via an offsite sensor.

17. The computer readable program product of claim 2, wherein the first sensor data is received via an offsite sensor and the second sensor data is received via an onsite sensor.

* * * * *